(12) United States Patent
Jeannin

(10) Patent No.: US 6,587,574 B1
(45) Date of Patent: Jul. 1, 2003

(54) SYSTEM AND METHOD FOR REPRESENTING TRAJECTORIES OF MOVING OBJECTS FOR CONTENT-BASED INDEXING AND RETRIEVAL OF VISUAL ANIMATED DATA

(75) Inventor: Sylvie Jeannin, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/375,949

(22) Filed: Aug. 17, 1999

Related U.S. Application Data (60) Provisional application No. 60/117,656, filed on Jan. 28, 1999.

(51) Int. Cl.[7] ............................................... G06K 9/00
(52) U.S. Cl. ............................................ 382/107; 345/949
(58) Field of Search ................................. 382/103, 107, 382/120, 122, 150; 345/473, 474, 706, 709, 949, 956, 977; 198/641

(56) References Cited

U.S. PATENT DOCUMENTS 5,261,041 A * 11/1993 Susman ........................ 345/473
5,594,856 A * 1/1997 Girard ........................... 345/473
6,088,042 A * 7/2000 Handelman et al. ......... 345/473

OTHER PUBLICATIONS

Beichner R J et al: "VideoGraph: a new way to study kinematics" Conference on Computers in Physics Instruction. Proceedings, Raleigh, NC, USA, Aug. 1–5, 1988, pp. 244–245.

* cited by examiner

Primary Examiner—Jayanti K. Patel
Assistant Examiner—Abolfazl Tabatabai (57) ABSTRACT

There is disclosed, for use in a system for detecting a movement of a selected object in a sequence of visual animated data frames, a video processing device for generating a descriptor data structure representative of a trajectory of the selected object. The video processing device comprises an image processor for identifying the selected object in the visual animated data frames and determining a trajectory of the selected object in a two dimensional (2D) or three dimensional (3D) coordinate space. The image processor generates a descriptor data structure that contains a position (usually a starting position) of the object in the coordinate space; a speed of the object in the coordinate space; and an acceleration of the object in the coordinate space.

3 Claims, 4 Drawing Sheets

SYSTEM AND METHOD FOR REPRESENTING TRAJECTORIES OF MOVING OBJECTS FOR CONTENT-BASED INDEXING AND RETRIEVAL OF VISUAL ANIMATED DATA

CROSS-REFERENCE TO RELATED APPLICATIONS

The present invention is related to that disclosed in United States Provisional Patent Application No. 60/117,656, filed on Jan. 28, 1999, entitled "REPRESENTATION OF MOVING OBJECT TRAJECTORIES FOR CONTENT-BASED INDEXING AND RETRIEVAL OF VISUAL ANIMATED DATA", which is commonly assigned to the assignee of the present invention. The disclosure of this related provisional patent application is incorporated herein by reference for all purposes as if fully set forth herein.

TECHNICAL FIELD OF THE INVENTION

The present invention is directed, in general, to image retrieval systems and, more specifically, to a system for representing the trajectory of a moving object or region in animated visual data for subsequent content-based indexing, retrieval, editing, analysis and enhanced visualization.

BACKGROUND OF THE INVENTION

The advent of digital television (DTV), the increasing popularity of the Internet, and the introduction of consumer multimedia electronics, such as compact disc (CD) and digital video disc (DVD) players, have made tremendous amounts of multimedia information available to consumers. As video and animated graphics content becomes readily available and products for accessing it reach the consumer market, searching, indexing and identifying large volumes of multimedia data becomes even more challenging and important.

The term "visual animated data" in this disclosure refers to natural video, as well as to synthetic 2D or 3D worlds (e.g., VRML), or to a mixture of both video and graphics (e.g., MPEG-4). Different criteria are used to search and index the content of visual animated data, such as a video clip. Video processing systems have been developed for searching frames of visual animated data to detect, identify and label objects of a particular shape or color, or to detect text in the frames, such as subtitles, advertisement text, or background image text, such as a street sign or a "HOTEL" sign.

However, multimedia content-based indexing and retrieval systems rarely take into account the trajectory of objects in the frames of visual animated data. Many of these systems were developed only for still image retrieval. Some systems were later extended to animated data by first summarizing them as consecutive sequences of shots, then representing each shot using key-frames, and finally applying on the key-frames the techniques that were developed for the still images. In a few systems, consideration was given to camera motion in a shot, but still not to object trajectory.

VideoQ, developed by the ADVENT Project of the Image and Advanced TV Lab at Columbia university, is a multimedia content-based indexing and retrieval system that deals with object motion. VideoQ allows queries based on an object's motion trail(s). The motion trail of an object is described by an ordered sequence of the object's center of mass (i.e., centroid) trajectory vectors, for each time instant in the sequence.

In different application contexts dealing with visual animated data, other representations are used to deal with motion in video frames. In coding standards such as MPEG-1, MPEG-2, MPEG-4, H.261 and H.263, motion is represented as fields of two-dimensional vectors corresponding to the "motion" of blocks of pixels between each image. Motion vectors can be skipped at any time instant on any block(s) of the image. However, this block is then considered as non-moving at that time instant. Since the pixel blocks are typically only 8×8 to 16×16 in size, this representation leads to a large number of vectors in adjacent blocks and/or consecutive images that are very similar to each other.

Moreover, although this information is called "motion" in the above standards, it was not designed to match the actual real "motion" within the animated visual material. Instead, the information is used to find similarities in surrounding images that may reduce the coding cost of the current image. Therefore, such motion vectors are unsuitable for use in multimedia data indexing and retrieval.

Presently under development is a new MPEG standard, MPEG-7, which is intended to establish a standard set of "descriptive elements" that can be used to describe different aspects of multimedia data including the motion of objects. These descriptive elements, called Descriptors and Description Schemes, directly describe the content of the visual animated data, such as a video clip, thereby providing a fast and efficient way to search through an archive of video files and animated graphics files. Besides these Descriptors (D) and Description Schemes (DS), MPEG-7 will also standardize a language to express the descriptions (DDL). Descriptions are coded so that they can be transmitted and stored efficiently. The MPEG-7 standard, however, is nowhere near completion and many of its intended objectives may never be realized. There is no guarantee that the trajectory of objects will be adequately addressed.

There is therefore a need in the art for improved systems and methods for describing the trajectory of objects in a series of visual animated data frames. In particular, there is a need in the art for systems that are capable of determining the trajectory of an object in visual animated data frames and representing the detected trajectory of the objects in a Descriptor or Description Scheme that is suitable for use in a content-based indexing and retrieval system.

SUMMARY OF THE INVENTION

To address the above-discussed deficiencies of the prior art, it is a primary object of the present invention to provide a flexible and generic representation for the trajectory of objects in order to make searching and indexing easier. The disclosure does not address the coding of the description nor its expression within the description definition language (DDL). The proposed descriptive data structure, when using MPEG-7 terminology, can be considered either as a composited Descriptor or as a simple primary Description Scheme.

The present invention is not constrained to the needs of one or more particular applications or to any particular data source format. Advantageously, the present invention links descriptors to human perceptual criteria and to the actual semantic content that the data describe. Humans perceive motion at a high level. Accordingly, the present invention uses a high level description for the trajectory of an object by representing it in the scene as the trajectory of one point of the object, such as its center of mass (or centroid). In order to further describe the motion of a scene, the object-based descriptions can be complemented by a camera (or viewpoint) motion description. Finer details could also be added by complementing it with a description for the object deformation, if any.

In an advantageous embodiment of the present invention, there is provided, for use in a system capable of detecting a movement of a selected object in a sequence of visual animated data frames, a video processing device capable of generating a descriptor data structure representative of a trajectory of the selected object. The video processing device comprises an image processor capable of identifying the selected object in a first visual animated data frame and at least a second visual animated data frame and determining therefrom a trajectory of the selected object in a coordinate space having at least a first dimension and a second dimension. The image processor generates the descriptor data structure from the trajectory by generating at least two of: a) first trajectory data representing a position of the object in the coordinate space; b) second trajectory data from which a speed of the object in the coordinate space may be determined; and c) third trajectory data from which an acceleration of the object in the coordinate space may be determined.

The present invention therefore represents the trajectory of objects in generic, high-level terms that are readily understandable to a user. Thus, a user can search for an object in a sequence of visual animated data frames, such as a video tape, simply by giving an exemplary sequence or by giving a specific speed, acceleration, or location in the frames, or a combination thereof. The video processing device can then rapidly search the trajectory descriptor table for each object in the video tape in order to find object(s) that match the user-specified search criteria.

In one embodiment of the present invention, the coordinate space comprises a first dimension, a second dimension orthogonal to the first dimension, and a third dimension orthogonal to the first and second dimensions. Thus, the present invention may be used to create and to search the descriptor tables of objects moving in two dimensions, such as the descriptor tables in a video tape of cars moving past a surveillance camera. The present invention may also be used to create and to search the descriptor tables of objects moving in three dimensions, such as the descriptor tables of objects in a VRML environment.

In another embodiment of the present invention, the second trajectory data comprises a velocity value indicating a speed of the object. In still another embodiment of the present invention, the second trajectory data comprises a start position indicating a position of the object in the first visual animated data frame, an end position indicating a position of the object in the at least a second visual animated data frame, and an elapsed time value indicating a duration of time between the first visual animated data frame and the at least a second visual animated data frame, and wherein the speed of the object is determined from the start time, the end time, and the elapsed time value. Thus, the present invention may calculate the speed of the object and save the speed value directly in the descriptor table. Alternatively, the present invention may store the speed indirectly by saving the start position of the object in one frame and the end position in another frame, along with the elapsed time between the frames, and thereafter the speed may be calculated when needed.

In yet another embodiment of the present invention, the speed determined from the second trajectory data is an absolute speed given in relation to the boundaries of the visual animated data frames. In a further embodiment of the present invention, the speed determined from the second trajectory data is a relative speed given in relation to a background scene of the visual animated data frames. This allows the present invention to account for the motion, if any, of the camera that recorded the sequence of animated visual data frames, or of any applicable viewpoint (e.g., a joystick simulated for 3D games). The object's trajectory may be represented in terms of its speed inside the frame boundaries (e.g., a fixed camera) or in terms of its speed relative to background objects (e.g., camera moving with the object).

In a still further embodiment of the present invention, the video processing device modifies the sequence of visual animated data frames by associating the descriptor data structure with the sequence of visual animated data frames. Thus, the video processing device can generate trajectory descriptor tables for one or more objects in a video data file or other visual animated data file and associate the trajectory descriptor table(s) with the video file, such as by linking it to the file or by merging it into the file, and the like. The link used may include semantic references for linking the descriptions to an object, special references for linking the descriptions to a region, or temporal references for linking the descriptions to temporal positions in the file. This makes subsequent searching easier since the descriptor files are part of the file and do not have to be generated at search time.

A trajectory descriptor table representing the trajectory of an object in a sequence of visual animated data frames may be embodied in a novel signal produced by and searchable by a video processing device in accordance with the present invention. The novel signal comprises, 1) a visual animated data signal comprising a sequence of visual animated data frames portraying a selected object; and 2) an object trajectory descriptor signal representative of a trajectory of the selected object, the object trajectory descriptor signal comprising a descriptor data structure indicating a trajectory of the selected object in a coordinate space having at least a first dimension and a second dimension, wherein the descriptor data structure comprises at least two of a) first trajectory data representing a position of the selected object in the coordinate space; b) second trajectory data from which a speed of the selected object in the coordinate space may be determined; and 3) third trajectory data from which an acceleration of the selected object in the coordinate space may be determined.

The novel object trajectory descriptor signal may be embedded in, and transmitted with, the sequence of visual animated data frames that form the visual animated data signal. Alternatively, the novel object trajectory descriptor signal may be distinct from, and transmitted or stored separately from, the sequence of visual animated data frames.

In an advantageous embodiment of a signal in accordance with the present invention, the coordinate space comprises a first dimension, a second dimension orthogonal to the first dimension, and a third dimension orthogonal to the first and second dimensions.

In one embodiment of a signal in accordance with the present invention, the second trajectory data comprises a velocity value indicating a speed of the selected object.

In another embodiment of a signal in accordance with the present invention, the second trajectory data comprises a start position indicating a position of the selected object in a first visual animated data frame, an end position indicating a position of the selected object in a second visual animated data frame, and an elapsed time value indicating a duration of time between the first visual animated data frame and the second visual animated data frame, and wherein the speed of the selected object is determined from the start time, the end time, and the elapsed time value.

In still another embodiment of a signal in accordance with the present invention, the speed determined from the second trajectory data is an absolute speed given in relation to the boundaries of the visual animated data frames.

In yet another embodiment of a signal in accordance with the present invention, the speed determined from the second trajectory data is a relative speed given in relation to a background scene of the visual animated data frames.

The foregoing has outlined rather broadly the features and technical advantages of the present invention so that those is skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "processor" or "controller" means any device, system or part thereof that controls at least one operation, such a device may be implemented in hardware, firmware or software, or some combination of at least two of the same. "Object" herein means any semantic entity or group of pixels selected throughout a sequence. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video processing system.

Figure 1:
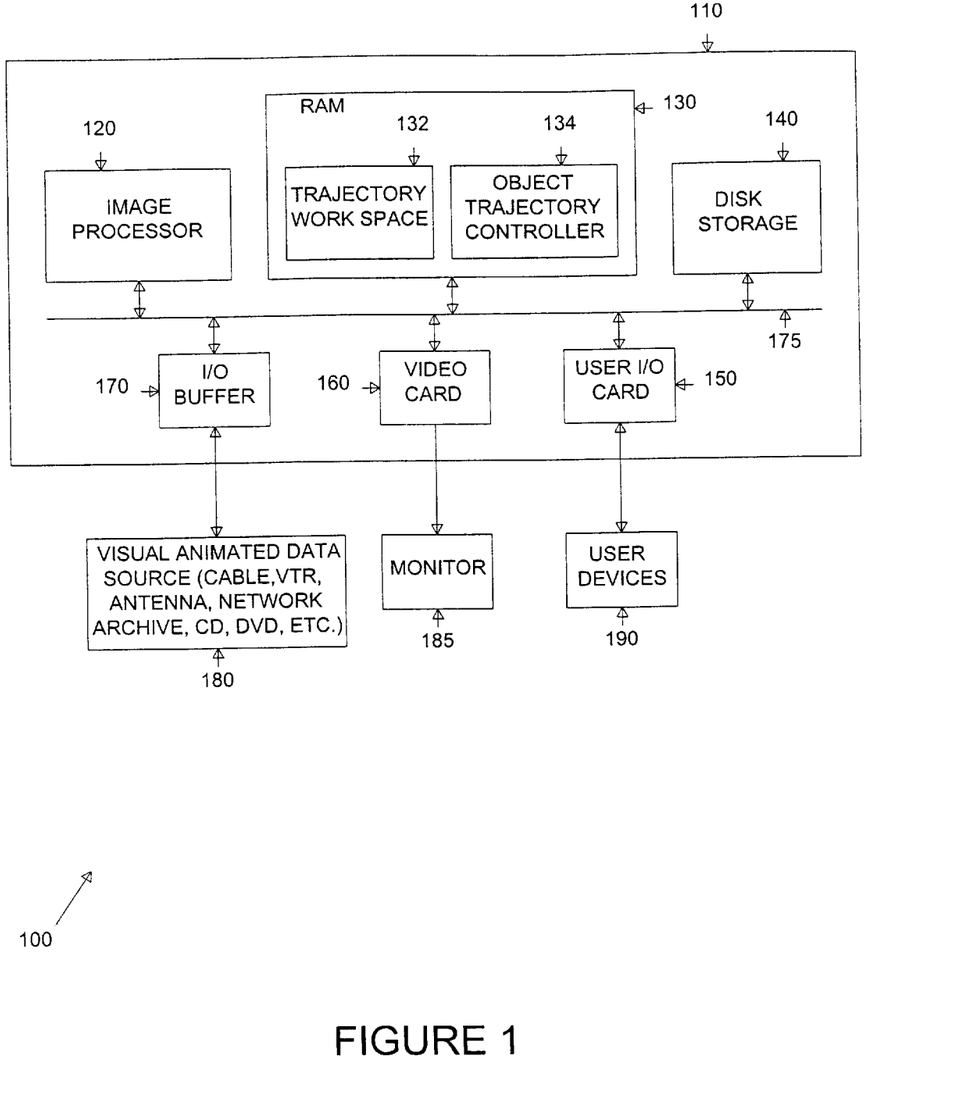
FIG. 1 illustrates an exemplary object trajectory analysis system in accordance with one embodiment of the present invention.

FIG. 1 illustrates exemplary object trajectory analysis system 100 in accordance with one embodiment of the present invention. Object trajectory analysis system 100 comprises video processing device 110, visual animated data source 180, monitor 185, and user devices 190. Video processing device 110 analyzes received visual animate data images in accordance with the principles of the present invention to determine the trajectories of objects between images (individual frames) based on the moving objects' centers of mass (or centroids). Video processing device 110 then creates high-level descriptors that represent the trajectory of each object and merges the descriptors with the original visual animated data signal to thereby create a unique new signal. The new signal then may be searched by a video processing system by matching the trajectory information stored in the descriptor with trajectory criteria selected by a user or selected by the video processing system itself.

Visual animated data source 180 provides for the transfer of video images to and from video processing device 110. Visual animated data source 180 may be one or more of a cable, video tape recorder (VTR), antenna, network archive (including the Internet), compact disc (CD) player/recorder, a digital video disc (DVD) player/recorder, or similar device capable of providing and storing digitized animated video images, with or without audio. Visual animated data source 180 may have capability for providing a few video clips of short length or for multiple clips, including longer length digitized animated video images. Visual animated data source 180 may also provide animated video data in any known format, such as D-1 format.

Monitor 185 displays the animated video image and may be equipped for audio, as required. User device(s) 190 represents one or more peripheral devices that may be manipulated by the user of object trajectory analysis system 100 to provide user inputs for the system. Typical peripheral user input devices include a computer mouse, a keyboard, a lightpen, a joystick, a touch-table and associated stylus, and/or any other device that may selectively be used to enter, to select, and/or to manipulate data, including all or portions of the displayed video image(s). User device(s) 190 may be capable of selecting the desired animated visual sequence, object, and/or trajectory identification attributes for input to video processing device 110. User devices 190 may also include output devices, such as a color printer for printing hard copies of particular images.

Video processing device 110 comprises image processor 120, RAM 130, disk storage 140, user I/O card 150, video card 160, I/O buffer 170, and processor bus 175. Processor bus 175 transfers data between the various elements of video processing device 110. RAM 130 further comprises trajectory work space 132 and object trajectory controller 134.

Image processor 120 provides over-all control for video processing device 110 and performs the image processing required for object trajectory analysis system 100, including analyzing trajectory in visual animated data frames based upon user/system selected attributes. This includes implementation of editing processes, processing of digitized visual animated data frames for transfer to monitor 185 or for storage in disk storage 140, and control of data transfer between the various elements of the object trajectory analysis system 100. The requirements and capabilities for image processor 120 are well known in the art and need not be described in greater detail other than as required for the present invention.

RAM 130 provides random access memory for temporary storage of data produced by video processing device 110, which is not otherwise provided by components within the system. RAM 130 includes memory for trajectory work space 132 and object trajectory controller 134, as well as other memory required by image processor 120 and associated devices. Trajectory work space 132 represents the portion of RAM 130 in which video images and descriptors associated with a particular video clip(s) are temporarily stored during the trajectory analysis process. Trajectory work space 132 allows frames within a clip to be analyzed and modified without impacting the original data, so that the original data can be recovered, if required.

Object trajectory controller 134 represents the portion of RAM 130 dedicated to storage of the application program executed by image processor 120 to perform the object trajectory analysis of video images on the basis of system/user defined attributes. Object trajectory controller 134 may be embodied as a program on a CD-ROM, computer diskette, or other storage media that may be loaded into a removable disk port in disk storage 140 or elsewhere, such as in video clip source 180.

Disk storage 140 comprises one or more disk systems, including removable disks, for permanent storage of programs and other data, including required animated video and audio data. Depending upon system requirements, disk storage 140 is configured to interface with one or more bidirectional buses for the transfer of video (and audio) data to and from visual animated data source(s) 180, as well as the rest of the system. Disk storage 140 is capable of transferring data at video rates, as required. As a minimum, disk storage 140 is sized to provide adequate storage for several minutes of video for object trajectory analysis purposes, in addition to other required space for programs and associated data. Depending upon specific applications and the capability of image processor 120, disk storage 140 may be configured to provide capability for storage of a large number of video clips and their associated object trajectory information.

User I/O card 150 provides the means for interfacing user device(s) 190 to the rest of object trajectory analysis system 100. User I/O card 150 converts data received from user devices 190 to the format of interface bus 175 for transfer to image processor 120 or to RAM 130 for subsequent access by image processor 120. User I/O card 150 also transfers data to user output devices such as printers. Video card 160 provides an interface between monitor 185 and the rest of video processing device 110 through data bus 175.

I/O buffer 170 provides an interface between visual animated data source 180 and the rest of object trajectory analysis system 100 through bus 175. As previously discussed, visual animated data source 180 has at least one bidirectional bus for interfacing with I/O buffer 170. I/O buffer 170 is able to transfer data, including a novel signal comprising trajectory descriptors in accordance with the principles of the present invention, to and from visual animated data source 180 at the minimum required video image transfer rate.

I/O buffer 170 transfers data received from visual animated data source 180 to disk storage 140, to image processor 120, and to RAM 130, as required, to provide temporary storage for object trajectory analysis, editing, and monitor display purposes. The simultaneous transfer of the video data to image processor 120 and video card 160 provides means for display of the video image as it is received by the system.

Figure 2:
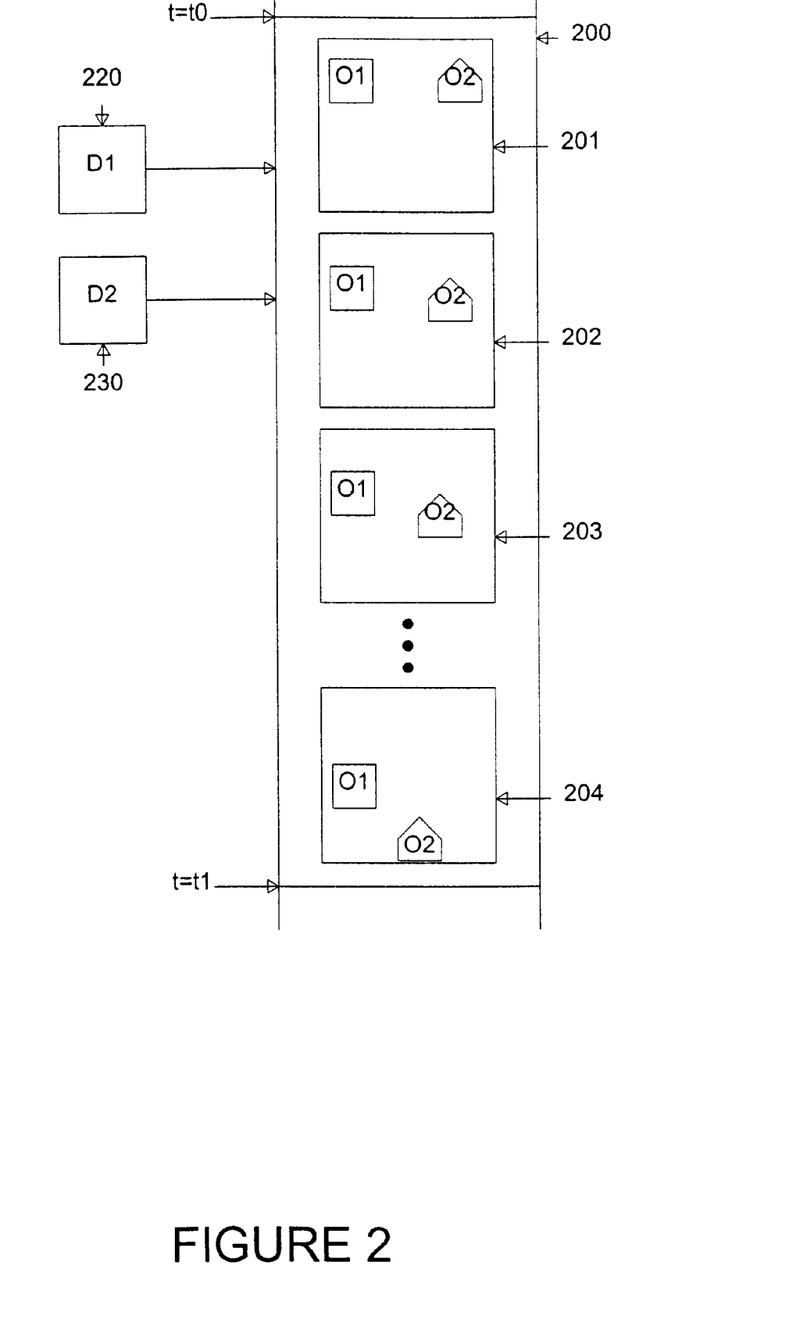
FIG. 2 illustrates an exemplary visual animated data clip which comprises a series of image frames.

FIG. 2 illustrates exemplary visual animated data clip 200, which comprises a series of image frames 201–204. Visual animated data clip 200 may be, for example, a standard video clip of "real world" scenes or computer-generated animation frames. Image frames 201–204 show the movement of two objects, arbitrarily labeled O1 and O2, from start positions in image frame 201 to end positions in image frame 204. Image frame 201 occurs at time t=t0 and image frame 205 ends at time t=t1. The time lapse from image frame 201 to image frame 204 is given by (t1−t0).

FIG. 2 also illustrates exemplary descriptors 220 and 230, arbitrarily labeled D1 and D2. Descriptor D1 represents the trajectory of object O1 and Descriptor D2 represents the trajectory of object O2. Descriptors D1 and D2 provide trajectory information for objects O1 and O2, respectively, based upon the movement of their centroids through frames 201–204. Each object's centroid provides a single reference point within each frame that is used to analyze the object's movement. The trajectory of the object's centroid is the basis for describing the motion or trajectory of the object from frame 201 to frame 204.

In one embodiment of the present invention, the trajectory descriptor for a specific object may include the initial and final positions of the object. Image processor 120 may calculate the object's speed using the change in position of the object between a first frame and a second frame and using the time duration elapsing between the first frame and the second frame. In another embodiment of the present invention, the descriptor may include the speed of the object directly, rather than calculating it through position change and time lapse.

Video processing device 110 creates generic descriptors of the trajectory of an object by using the fundamental physical laws of mechanics to represent the trajectory of an object. An exemplary descriptor of the two dimensional (2D) trajectory of an object in an (x,y) coordinate system contains the object's position, speed and acceleration in the x-dimension and the object's position, speed and acceleration in the y-dimension. An exemplary descriptor of the three dimensional (3D) trajectory of an object in an (x,y,z) coordinate system will additionally contain the object's position, speed and acceleration in the z-dimension.

In one embodiment of the present invention, the following second order approximation is used to represent the final x-coordinate for a moving object:

$$\forall t \in [t_0, t_1], \ x(t-t_0) = x_0 + v_x(t-t_0) + \tfrac{1}{2} a_x(t-t_0)^2$$

where $\forall t \in [t_0, t_1]$ indicates that the equation applies for all time between $t_0$ and $t_1$. The term $t_0$ is the time of the first frame. The term $x_0$ is the x-position of the object at $t_0$. The term $v_x$ is the object's velocity in the x-dimension, assumed to be constant between $t_0$ and $t_1$. The term $a_x$ is the object's acceleration in the x-dimension, assumed to be constant between $t_0$ and $t_1$.

Similarly, the y-dimension trajectory and z-dimension trajectory of an object are given by:

$$\forall t \in [t_0, t_1], \ y(t-t_0) = y_0 + v_y(t-t_0) + \tfrac{1}{2}a_y(t-t_0)^2$$
$$z(t-t_0) = z_0 + v_z(t-t_0) + \tfrac{1}{2}a_z(t-t_0)^2$$

The z-coordinate is required for three dimensional images, such as computer-aided design systems for structures and animated computer games. This three dimensional trajectory representation is particularly attractive since it is related to the perceptual view of the human eye.

In one embodiment of the present invention, an exemplary descriptor may be created as object code defining the trajectory of an object. An exemplary object code embodiment may appear as follows:

Object_Trajectory:
  (Number_of_time_instants
  Spatial_reference
  Camera_followed)
  For each time_instant:
    Time_start, Time_end
    Starting_Positions(x,y,z)/confidence
    Speeds(x,y,z)/confidence
    Accelerations(x,y,z)/confidence.

The term "Object_Trajectory" represents the trajectory descriptor for a particular object as it travels through moving images, such as a video clip. The term "Number_of_time_instants" represents the number of time periods or groups of frames that are used in describing the trajectory of an object. The term "Spatial_reference" specifies whether the data are determined from the image reference (selected video clip) or from global motion information (i.e., background movement). The term "For each time_instant" represents information that is required when identifying an object's trajectory during a particular time interval (time_instant) of the selected video images. The terms "Time_start" and "Time_end" represent the time for the first (start) and last (end) frame of the selected time_instant.

The terms "Starting_Positions(x,y,z)/confidence" represent the starting x-, y-, z-coordinates for the centroid of the object at time_start of the selected time_instant, with consideration to a position confidence factor. The terms "Speeds(x,y,z)/confidence" represent the centroid's velocity, with consideration to a velocity confidence factor. The terms "Accelerations(x,y,z)/confidence" represent the centroid's acceleration, with consideration to an acceleration confidence factor. Finally, the term "Camera_followed" indicates whether the camera angle is fixed or following the object.

If the camera is not moving, the information concerning velocity and acceleration of the object may be described by the movement of the object through the video clip or group of frames, without further consideration of the camera. If the camera is moving, the velocity and acceleration of the object are affected by the velocity and acceleration of the camera or background.

Trajectories are analyzed on the basis of two primary classifications which describe whether the moving object is followed by the camera or not. When an object is followed by the camera, it may exhibit very little movement within the frame and its trajectory may only be caused by jitter of the camera. In such cases, it may make no sense to compare the inconsequential trajectory with search criteria specified by a user. Therefore, it is advantageous to identify objects which are being followed by the camera from others which are not.

Objects followed by the camera can be further identified as either stationary objects at positions near the image center or as objects moving with irregular, small displacements around a position near the image center (i.e., jittery motion). When the camera motion is known, the camera motion may be considered in determining whether or not the camera-followed object is to be further considered for trajectory matching. When camera motion is not known from user-provided or system-provided data, the camera trajectory speed/acceleration may be determined with respect to motion of the background and/or known object trajectory. In addition to considering trajectories with respect to camera and background motion, the positions, speeds and accelerations of moving objects may be normalized to be independent of the scale of the image.

Further, all referenced trajectory data do not need to be present in a trajectory descriptor if the application does not require the information. For example, a trajectory descriptor may be defined in terms of velocity and acceleration with the object position being determined when and if required. Or conversely, a descriptor element (such as the z-coordinate in a 2-dimensional image) may not be relevant for the particular application. Confidence factor across the time interval is optionally defined and associated with each element. For instance, confidence may denote the expected accuracy of the data as a function of how the data was extracted.

In the foregoing and following descriptions, the exemplary descriptors define the trajectory of the centroid of an object or region. This is not a requirement, however. In alternate embodiments of the present invention, an exemplary descriptor may define the trajectory of an object with reference to some other point in the object, such as the upper-right corner point, the foremost point on the leading edge, and the like.

Figure 3:
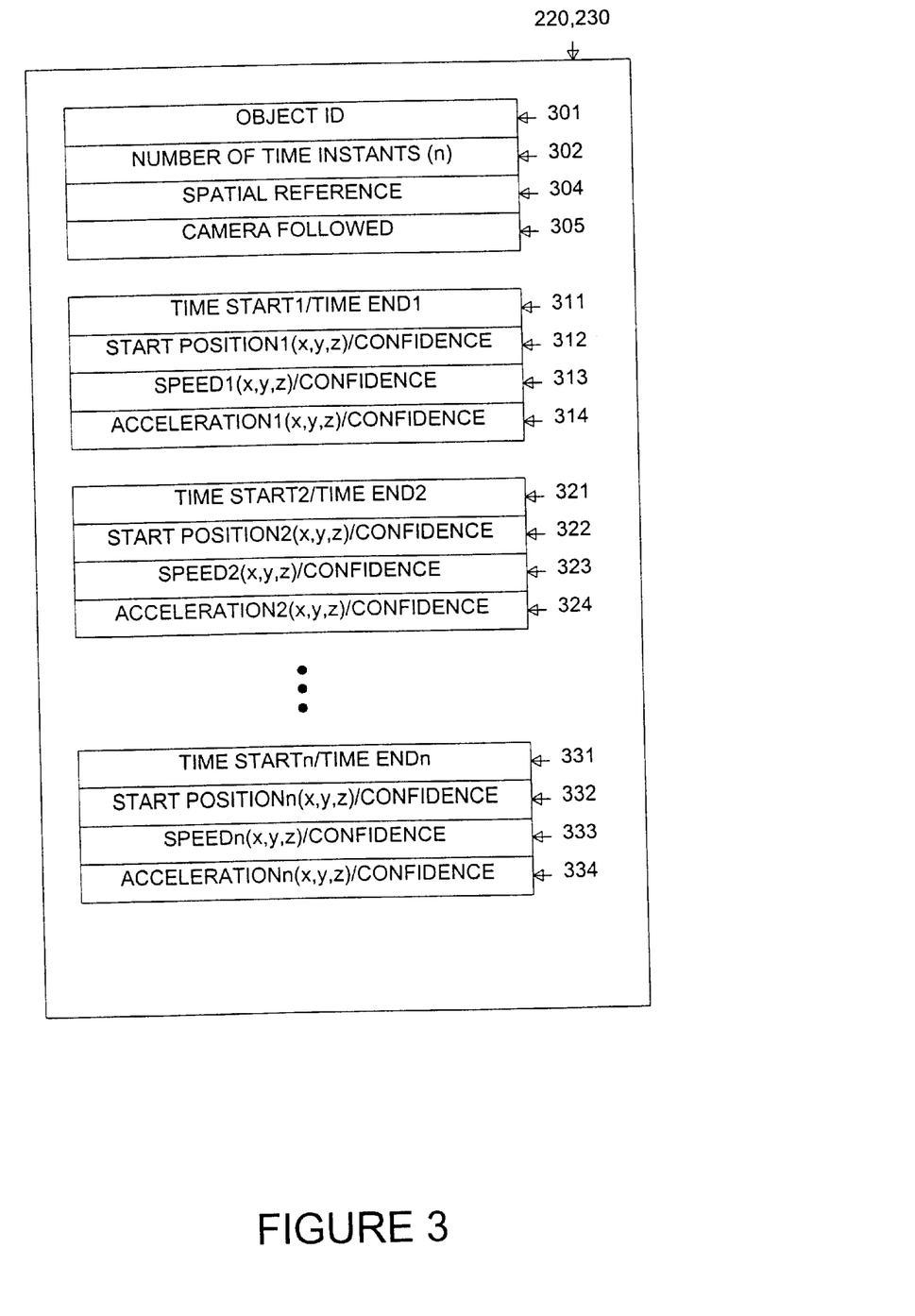
FIG. 3 illustrates an exemplary template embodiment of a descriptor representing the trajectory of an object in a visual animated data clip.

FIG. 3 illustrates an exemplary template embodiment for trajectory descriptors D1 and D2 (220 and 230), which describe the movements of objects O1 and O2 through the frames of video clip 200, as illustrated by FIG. 2. The fields of descriptors 220 and 230 contain the trajectory components. A plurality of descriptor tables, one for each selected object in an associated video clip, are required to describe the trajectories of all of the selected objects as they traverse the clip.

Each of descriptors 220 and 230 comprises object identification (ID) field 301, which contains a label identifying the object O1 or O2 associated with the descriptor, Number of Time Instants (N) field 302, and Spatial Reference field 304. Each of descriptors 220 and 230 further comprises "N" data blocks. Each of the N data blocks corresponds to one of the "N" time instants specified in the Number of Time Instants field 302.

Object ID field 301 may comprise information which describes the object on the basis of identifying characteristics such as initial location, color, size, shape, etc. In some embodiments, object ID field 301 may be a link to a location of another Descriptor or Description Scheme where the object is defined. The Number of Time Instants (N) field 302 refers to the number of intervals which have been user or system selected as time demarcations for the video clip being analyzed. For example, video clip 200 may contain one hundred frames that are divided into sub-groups of twenty frames each. In this case, Number of Time Instants field 302 would be equal to five and each of the five data blocks in the descriptor would pertain to one of the five sub-groups. The value N may be user or system defined.

Spatial Reference field 304 provides an indication of whether the movement of the object is based upon the location of the object as referenced within designated image frames or with respect to a more global or external reference.

Camera Followed field 305 provides an indication of whether the camera is moving with the object or not.

In the exemplary embodiment., each of the N data blocks comprise five data fields which represent an object's movement within the referenced time instant. For example, the first time instant is represented by the following data fields: Time Start1/Time End1 field 311, Start Position1 (x,y,z)/Confidence field 312, Speed1 (x,y,z)/Confidence field 313, and Acceleration1 (x,y,z,)/Confidence field 314.

As previously described, it may not be necessary for each field or portion of a field of the data block to be present in order for a descriptor table to support functions necessary for particular applications. For instance, if objects are only represented in two planes (x and y), the z-plane is ignored in the trajectory analysis. Also, depending upon the application, it may be sufficient for the descriptor table to only have the object identifier, acceleration, and velocity components. Image processor 120 may also calculate "missing" identifiers at the time that they are required for accomplishing a particular task. For instance, the ending location coordinates of a particular object may be determined only when required for object final location purposes. Alternatively, the Speed field may be replaced in descriptors 220 and 230 by an End Position value. The speed of an object can then be calculated using time start, time end, start position and end position.

The characteristics associated with the described object trajectory descriptor table provide several advantages when analyzing the trajectories of moving objects within video segments. The trajectory descriptor is based upon the content of the video image, approximates the physical "reality" of the scene, and represents motion as perceived by humans. Further, it is a generic form which is not dependant upon any specified, application or data format. Also, the representative descriptor template encompasses different perceptual aspects of trajectory, (i.e., position, speed and acceleration). This provides the capability for precisely and completely describing the trajectory of an object in various spatial planes, while also allowing the isolation of particular movement components so that the impact of a particular characteristic can be examined. This is possible because the three primary data elements are separately accessible in the representation. For instance, the acceleration of an object can be ignored in order to examine the movement of the object under conditions of constant velocity, when locating the object as it passes through a certain position, etc.)

Using the notations of the prior equations, the generic expression for the distance between two trajectory descriptions D and D' can be simple expressed as a weighted sum of Euclidean-based distances between positions, speeds and accelerations, as follows:

$$d(D, D') = \Sigma_i \alpha((x_i-x_i')^2+(y_i-y_i')^2+(z_i-z_i')^2)/(\Delta t_i)$$
$$+\beta((v_{xi}-v_{xi}')^2+(v_{yi}-v_{yi}')^2+(v_{zi}-v_{zi}')^2)/(\Delta t_i)$$
$$+\chi((a_{xi}-a_{xi}')^2+(a_{yi}-a_{yi}')^2+(a_{zi}-a_{zi}')^2)/(\Delta t_i)$$

where i represents all of the successive time instants described in both descriptors. The prime terms pertain to D'. The term $\Delta t_i$ is the duration of the $i^{th}$ time instant. The terms $\alpha$, $\beta$, and $\chi$ depend on the selected matching requirements (if available) and on the confidences.

Figure 4:
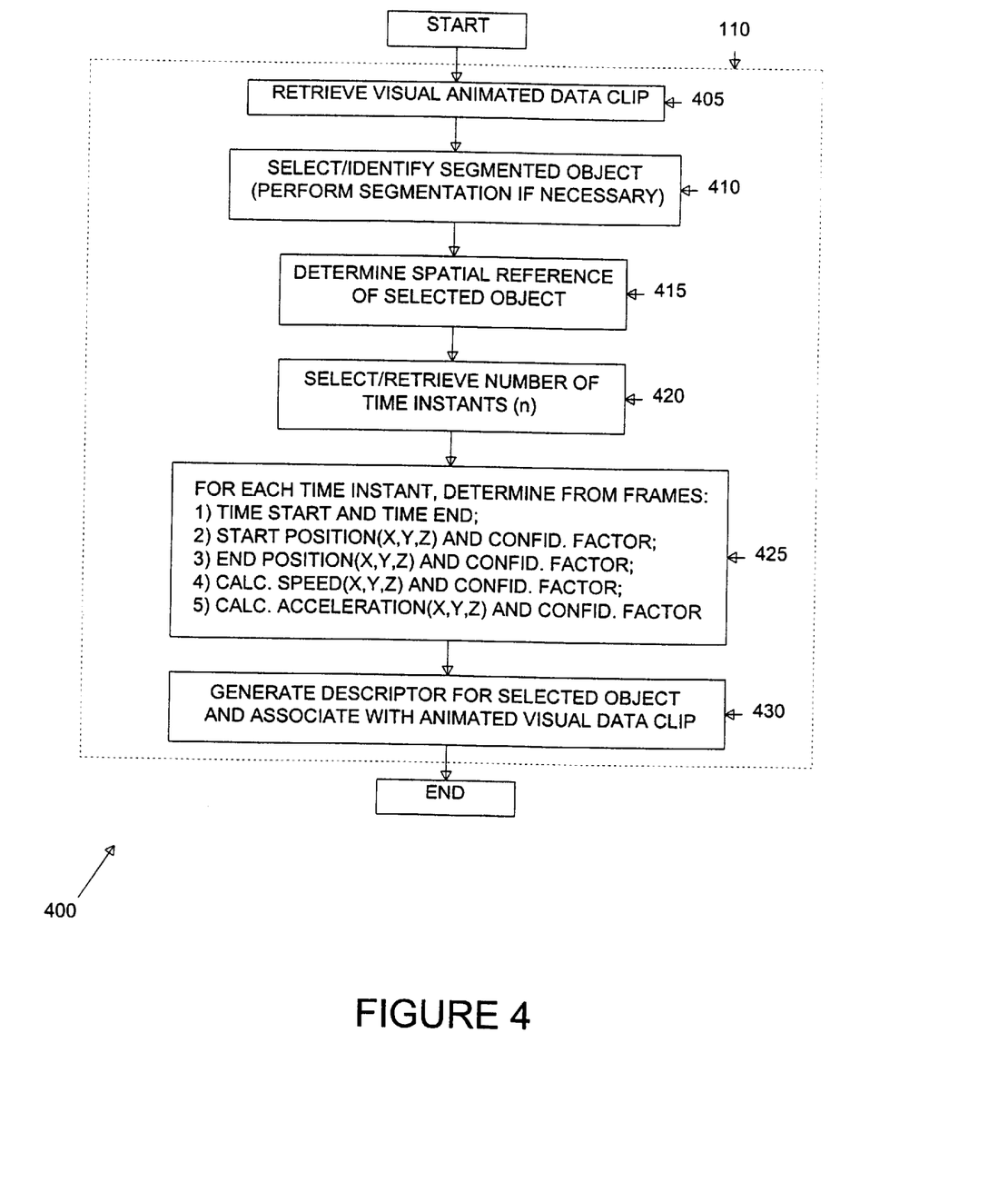
FIG. 4 is a flow diagram illustrating the generation of an exemplary descriptor in the video processing device in FIG. 1 in accordance with one embodiment of the present invention.

FIG. 4 depicts flow diagram 400, which illustrates the generation of an exemplary descriptor in video processing device 110 using object trajectory controller 134 in accordance with one embodiment of the present invention. A visual animated data clip is retrieved from visual animated data source 180 and stored in disk storage 140 and trajectory work space 132 (process step 405). User-defined or system-defined criteria are received through user I/O card 150 and stored in trajectory work space 132. These criteria are used to identify the object and for determination of its centroid for trajectory analysis (process step 410). If required, segmentation processes (such as color/shape identification) may be used to segment or isolate the object for use in the trajectory analysis process. The required object identification information is stored in exemplary data field 301.

Next, image processor 120 determines the spatial reference, selected by the user or specified by the system, which indicates whether the trajectory data take into consideration global motion information (process step 415). The spatial reference is stored in exemplary data field 304.

The Number of Time Instants (N) are obtained through retrieval of time data references received with the visual data, user selected data, or system default data. In one embodiment of the present invention, image processor 120 may calculate N and segment the video clip into time instants based upon user/system defined characteristics, such as change in the object's direction or velocity. For this example, it is assumed that a system default sets N to represent division of the video clip into N sub-groups with the same number of video frames in each sub-group (i.e., each time instant will be have an elapsed time equal to 1/N of the total time of the visual animate data clip 200). The Number of Time Instants N is stored in data field 302 (process step 420). Alternatively, the Number of Time Instants N may be adaptively determined by image processor 120 based on the trajectory of the object.

Next, image processor 120 determines the position of the centroid of the selected object in each frame and calculates, for each of the N time instants: Time Start, Time End, Starting Positions (x,y,z) and Confidence, Speeds (x,y,z) and Confidence, Accelerations (x,y,z) and Confidence (process step 425). The Camera Followed variable may be specified by assuming that the object is not moving with respect to the image or to a stable background, depending on the spatial reference. Alternatively, if the object is moving very little with respect to the camera, but the background is moving a lot, it may be assumed that the camera is moving with the object.

In addition, when a large number of frames are present within a time instant, the time instant may be sub-divided and the centroid's speed for each sub-division can be calculated. An average acceleration may also be calculated across the time instant. As previously discussed, confidence factors may be assigned for each of the trajectory terms on the basis of the quality of the initial data, number of data samples, etc.

The speed or velocity of the object for each time instant may be calculated as the local first order derivative of the centroid position, normalized by the image size. In other words, the speed may be determined on the basis of the difference between the starting and ending positions and the amount of elapsed time. (As required, z information may be deduced from the size variation of the object between consecutive frames, taking into account the object's complete presence in the image and/or its shape variation.) Similarly, the acceleration may be calculated as the local second order derivative of the centroid positions, normalized by the image size.

Finally, image processor 120 stores the data determined in process step 425 in a descriptor associated with the selected object and associates the new descriptor with animated visual data clip 200 (process step 430). The descriptor may be associated with animated visual data clip 200 by merging it into animated visual data clip 200 or by storing it separately from animated visual data clip 200 and linking it to animated visual data clip 200.

The resultant trajectory descriptor table for the selected object is stored in trajectory work space 132, disk storage 140, and external visual animated data source 180, as required. In addition, the resultant trajectory descriptor table may be placed in a novel signal format for transfer with other data associated with the animated visual data clip, for recovery and use by other sources.

Although the present invention has been described in detail, those skilled in the art should understand that they can make various changes, substitutions and alterations herein without departing from the spirit and scope of the invention in its broadest form.

What is claimed is:

1. A video processing device for generating a descriptor data structure representative of a trajectory of an object, said video processing device comprising:
    an image processor for identifying the object in a sequence of visual animated data frames and determining a trajectory of the object within a coordinate space associated with the sequence of visual animated data frames, wherein said image processor generates the descriptor data structure from the trajectory by generating at least one of:
        first trajectory data representative of a position of the object in the coordinate space,
        second trajectory data representative of a velocity of the object in the coordinate space, and
        third trajectory data representative of an acceleration of the object in the coordinate space; and
    memory means for storing the sequence of visual animated data frames and the descriptor data structure, wherein the sequence of visual animated data frames is retrievable from said memory means in response to a user input of at least one of the position of the object in the coordinate space, the velocity of the object in the coordinate space, and the acceleration of the object in the coordinate space.

2. A video animated data frame file stored on a computer readable storage medium, said video animated data frame file comprising:
    a sequence of visual animated data frames portraying an object; and
    a descriptor data structure indicating a trajectory of the object in a coordinate space associated with the sequence of visual animated data frames, said descriptor data structure including at least one of:
        first trajectory data representative of a position of the object in the coordinate space,
        second trajectory data representative of a velocity of the object in the coordinate space, and
        third trajectory data representative of an acceleration of the object in the coordinate space; and
    wherein the sequence of visual animated data frames is retrievable from said computer storage readable medium in response to a user input of at least one of the position of the object in the coordinate space, the velocity of the object in the coordinate space, and the acceleration of the object in the coordinate space.

3. A method of generating and storing a descriptive data structure representative of a trajectory of an object, said method comprising:
    identifying the object in a sequence of visual animated data frames;
    determining the trajectory of the object in a coordinate space associated with the sequence of visual animated data frames;
    generating the descriptive data structure including at least one of:
        first trajectory data representative of a position of the object in the coordinate space,
        second trajectory data representative of a velocity of the object in the coordinate space, and
        third trajectory data representative of an acceleration of the object in the coordinate space; and
    storing the sequence of visual animated data frames and the descriptor data structure within a computer storage readable medium, wherein the sequence of visual animated data frames is retrievable from the computer storage readable medium in response to a user input of at least one of the position of the object in the coordinate space, the velocity of the object in the coordinate space, and the acceleration of the object in the coordinate space.

* * * * *